United States Patent
Hayashikawa et al.

(10) Patent No.: US 10,050,402 B2
(45) Date of Patent: Aug. 14, 2018

(54) GAS LASER OSCILLATION DEVICE AND GAS LASER PROCESSING MACHINE

(75) Inventors: Hiroyuki Hayashikawa, Osaka (JP); Hitoshi Hongu, Hyogo (JP); Nobuo Shinno, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 337 days.

(21) Appl. No.: 13/511,024

(22) PCT Filed: Nov. 17, 2010

(86) PCT No.: PCT/JP2010/006745
§ 371 (c)(1),
(2), (4) Date: May 21, 2012

(87) PCT Pub. No.: WO2011/064966
PCT Pub. Date: Jun. 3, 2011

(65) Prior Publication Data
US 2012/0285931 A1    Nov. 15, 2012

(30) Foreign Application Priority Data
Nov. 24, 2009   (JP) .................. 2009-265971

(51) Int. Cl.
*B23H 1/00*    (2006.01)
*H01S 3/036*    (2006.01)
(Continued)

(52) U.S. Cl.
CPC .............. *H01S 3/036* (2013.01); *F04D 17/16* (2013.01); *F04D 27/00* (2013.01); *F04D 29/063* (2013.01)

(58) Field of Classification Search
CPC ........ H01S 3/036; H01S 3/0979; F04D 17/16; F04D 27/00; F04D 29/063
(Continued)

(56) References Cited

U.S. PATENT DOCUMENTS 5,111,474 A * 5/1992 Funakubo et al. ............. 372/61
5,528,618 A * 6/1996 Schlie et al. .................... 372/58
(Continued)

FOREIGN PATENT DOCUMENTS

JP    61-108856 A    5/1986
JP    62-224720 A    10/1987
(Continued)

OTHER PUBLICATIONS

International Application Serial No. PCT/JP2010/006745, International Search Report dated Dec. 14, 2010, 2 pgs.
(Continued)

*Primary Examiner* — Michael G Hoang
(74) *Attorney, Agent, or Firm* — RatnerPrestia

(57) ABSTRACT

A gas laser oscillation device of the present invention including a blower unit having a rotating part that rotates, which includes an impeller, a rotating shaft, a motor rotor and a portion of bearings that are brought into contact with the rotating shaft, and a non-rotating part that does not rotate, which includes a motor stator, a casing and a portion of the bearings that are brought into contact with the casing. Two bearings are disposed between the rotating part and the non-rotating part. A grease supply mechanism that supplies grease to each of the two bearings is provided. A control unit drives the blower unit at a rotation rate lower than a rotation rate when a laser is output, after grease is supplied from the grease supply mechanism to the two bearings.

9 Claims, 5 Drawing Sheets

(51) Int. Cl.
*F04D 29/063* (2006.01)
*F04D 17/16* (2006.01)
*F04D 27/00* (2006.01)

(58) Field of Classification Search
USPC .................. 219/121.67, 121.78, 121.84
See application file for complete search history.

(56) References Cited

U.S. PATENT DOCUMENTS

| | | | |
|---|---|---|---|
| 2003/0113048 A1 | 6/2003 | Azumi | |
| 2004/0125850 A1* | 7/2004 | Hayashikawa et al. | 372/85 |
| 2005/0129342 A1 | 6/2005 | Azumi | |
| 2006/0049147 A1* | 3/2006 | Hayashikawa et al. | 219/121.6 |
| 2007/0266821 A1 | 11/2007 | Azumi | |
| 2008/0056325 A1* | 3/2008 | Ohta et al. | 372/58 |
| 2008/0059089 A1* | 3/2008 | Hornick et al. | 702/63 |
| 2008/0083585 A1* | 4/2008 | Yanohara | 184/6.1 |

FOREIGN PATENT DOCUMENTS

| | | | | | |
|---|---|---|---|---|---|
| JP | 63-53397 | A | | 3/1988 | |
| JP | 02-06114 | A | | 3/1990 | |
| JP | 02-194679 | A | | 8/1990 | |
| JP | 03-218083 | A | | 9/1991 | |
| JP | 03-292475 | | | 12/1991 | |
| JP | 05102576 | A | * | 4/1993 | ............ H01S 3/097 |
| JP | 06216437 | A | | 8/1994 | |
| JP | 2002090646 | A | | 3/2002 | |
| JP | 2003113846 | A | | 4/2003 | |
| JP | 2005221042 | A | | 8/2005 | |
| JP | 2012-094556 | A | | 5/2012 | |
| WO | WO 2006/111695 A1 | | | 10/2006 | |
| WO | WO 2010/095366 A1 | | | 8/2010 | |

OTHER PUBLICATIONS

Chinese Search Report for Application No. 201080050463.9.
Supplementary European Search Report for Application No. EP 10 83 2822, dated May 13, 2014.

* cited by examiner

GAS LASER OSCILLATION DEVICE AND GAS LASER PROCESSING MACHINE

This application is a U.S. National Phase Application of PCT International Application No. PCT/JP2010/006745.

TECHNICAL FIELD

The present invention relates to a gas laser oscillation device including a blower unit for circulating a laser gas, and a gas laser processing machine.

BACKGROUND ART

In general, in a gas laser oscillation device, a pair of electrodes are disposed in a hermetically-sealed enclosure, and a laser gas as an amplified medium filled in the enclosure is forcefully circulated by a blower unit such as a blower. The gas laser oscillation device has a configuration in which the laser gas is excited by electric discharge generated by the pair of electrodes in the enclosure, a resonator is formed by a partial reflection mirror and a total reflection mirror, and laser is output from the partial reflection mirror to the outside.

Furthermore, the gas laser oscillation device feeds irradiated laser to a machining head through an optical system including a plurality of mirrors so as to irradiate a position of a workpiece positioned on a machining table with the laser. Thus, the gas laser oscillation device is used as a light source for processing of a gas laser processing machine that carries out predetermined processing with respect to the workpiece.

In such a gas laser oscillation device, a blower unit for circulating a laser gas has a configuration in which a rotating shaft connected to an impeller for blowing the laser gas is held by a bearing, and the bearing is supplied with lubricating grease (see, for example, Patent Literature 1).

However, with such a conventional gas laser oscillation device, although grease can be appropriately supplied when grease is insufficient, the rotating shaft may rotate before the grease is sufficiently spread to a portion of the bearing in which grease is insufficient. As a result, wear and heat generation occur between the rotating shaft and the bearing, which has been one of the causes of shortening the lifetime of the bearing.

CITATION LIST

Patent Literature

PTL 1: Japanese Patent Unexamined Publication No. 2005-221042

SUMMARY OF THE INVENTION

The present invention has noted the problem, and provides a gas laser oscillation device in which the lifetime of a bearing can be extended and a gas laser processing machine.

A gas laser oscillation device of the present invention includes an electric discharge part to generate electric discharge in a laser gas, a blower unit to blow the laser gas to a portion in which electric discharge is generated by the electric discharge part, and a control unit to control drive of the blower unit. The blower unit of the gas laser oscillation device of the present invention includes a rotating part that rotates and a non-rotating part that does not rotate, bearings disposed between the rotating part and the non-rotating part, and a grease supply mechanism to supply grease to each of the bearings. The control unit of the gas laser oscillation device of the present invention is configured to drive the blower unit at a rotation rate lower than a rotation rate when a laser is output after grease is supplied from the grease supply mechanism to the bearings.

With this configuration, after grease is supplied from the grease supply mechanism to the bearing, the blower unit is driven at a rotation rate lower than the rotation rate when a laser is output. Therefore, grease is spread to the inside of the bearing, and wear and heat generation between the rotating shaft and the bearings can be reduced. Consequently, the lifetime of the bearing can be extended. Thus, the gas laser oscillation device of the present invention can ensure high reliability for a long time.

Furthermore, a gas laser processing machine of the present invention has a configuration including the above-described gas laser oscillation device, and a drive unit to move laser irradiated from the gas laser oscillation device relative to a workpiece to which the irradiated laser is applied.

With this configuration, after grease is supplied from the grease supply mechanism to the bearing, the blower unit is driven at a rotation rate lower than the rotation rate when a laser is output. Therefore, grease is spread to the inside of the bearing, and wear and heat generation between the rotating shaft and the bearings can be reduced. Consequently, the lifetime of the bearing can be extended. Thus, a gas laser processing device of the present invention can ensure high reliability for a long time.

As mentioned above, in the gas laser oscillation device and the gas laser processing device of the present invention, grease is spread to the inside of the bearing, and wear and heat generation between the rotating shaft and the bearing can be reduced. Therefore, the lifetime of the bearing can be extended, and high reliability can be ensured for a long time.

DESCRIPTION OF EMBODIMENTS

Hereinafter, exemplary embodiments of the present invention are described with reference to drawings. In the following drawings, the same references are given to the same components and the description thereof may be omitted.

First Exemplary Embodiment

Figure 1:
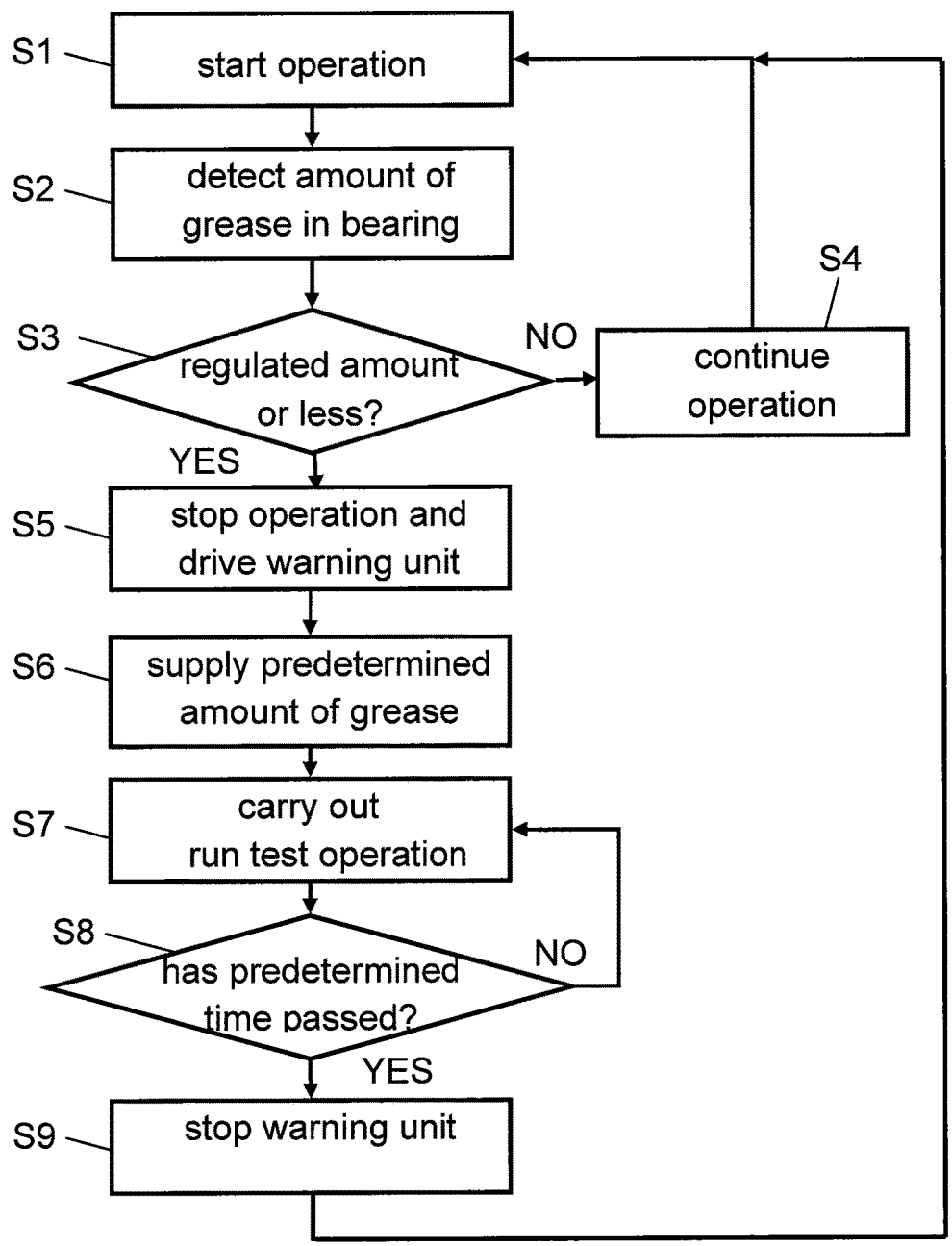
FIG. 1 is a flowchart of a gas laser oscillation device in accordance with a first exemplary embodiment of the present invention.
Figure 2:
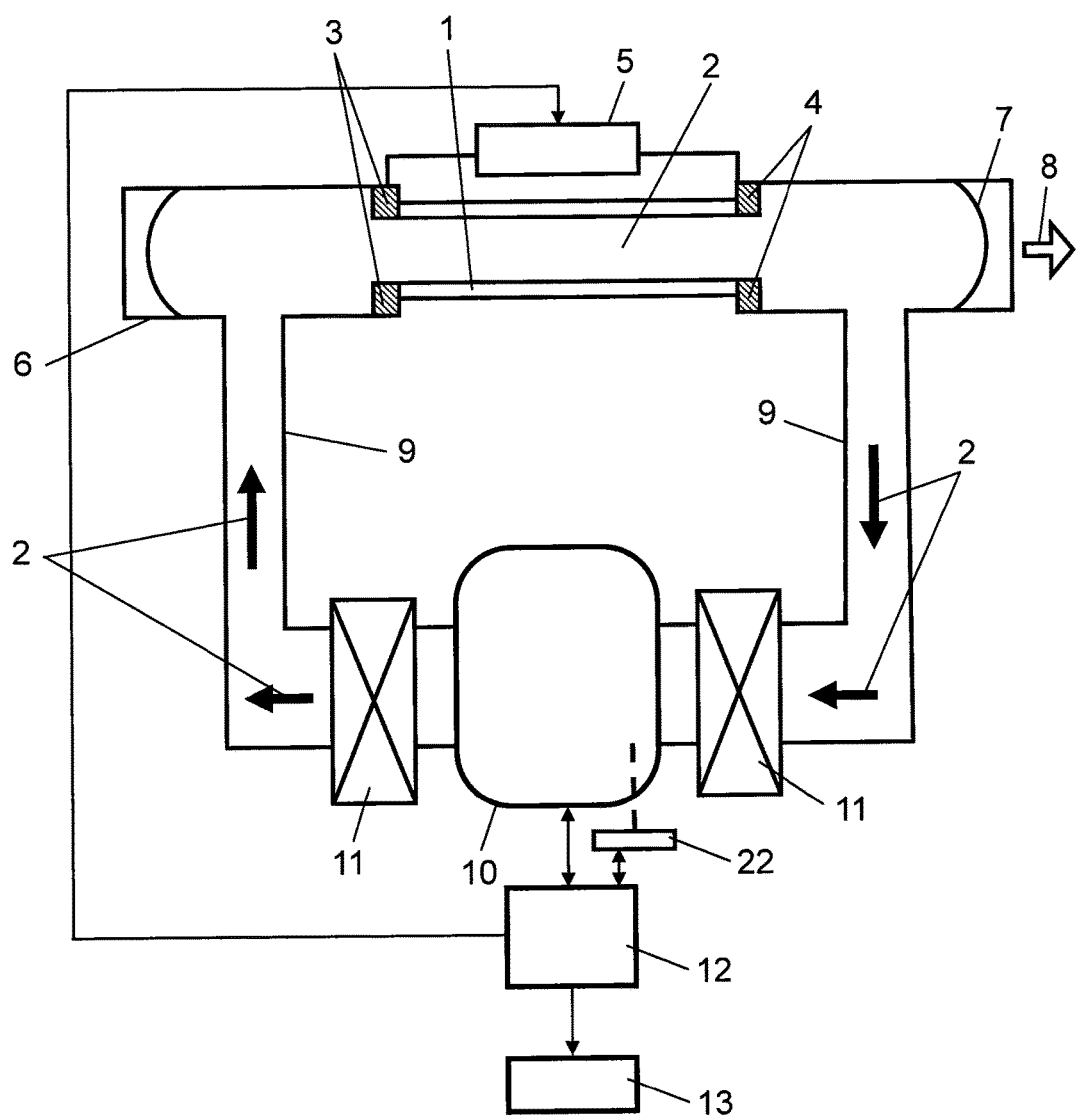
FIG. 2 is a configuration view of the gas laser oscillation device in accordance with the first exemplary embodiment of the present invention.
Figure 3:
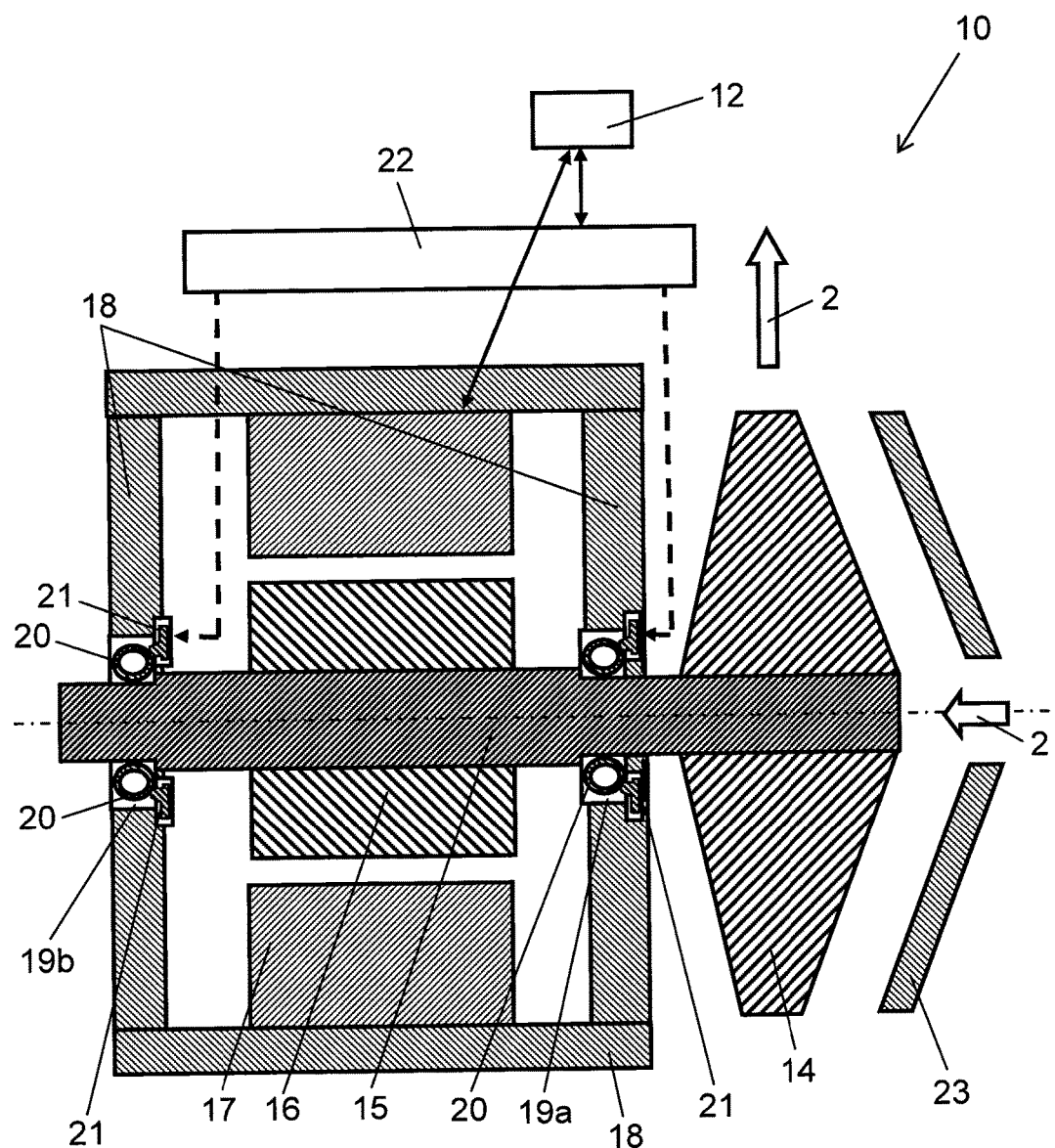
FIG. 3 is a configuration view of a main part of a blower unit of the gas laser oscillation device in accordance with the first exemplary embodiment of the present invention.

FIG. 1 is a flowchart of a gas laser oscillation device in accordance with a first exemplary embodiment of the present invention; FIG. 2 is a configuration view of the gas laser oscillation device in accordance with the first exemplary embodiment of the present invention; and FIG. 3 is a configuration view of a main part of a blower unit of the gas laser oscillation device in accordance with the first exemplary embodiment of the present invention.

As shown in FIG. 2, laser gas 2 is circulated in electric discharge tube 1 made of an insulating material such as glass. In the first exemplary embodiment, laser gas 2 is, for example, a mixed gas including carbon dioxide (hereinafter, referred to as "$CO_2$") gas as a main component, nitrogen gas and helium gas. Electric discharge tube 1 is provided with electrodes 3 and 4, and electric power 5 is connected to electrodes 3 and 4 to form an electric discharge part such that electric discharge is generated in electric discharge tube 1.

High-speed electrons generated by the electric discharge excite nitrogen molecules to a higher energy level. The excited nitrogen molecules collide with $CO_2$ molecules and impart energy to the $CO_2$ molecules to excite them, so that the energy level of the $CO_2$ molecules is raised. At this time, since the nitrogen molecules lost energy, the energy level thereof is lowered.

Then, $CO_2$ molecules in inverted population emit light. The light reciprocates in a resonator including total reflection mirror 6 and partial reflection mirror 7, which are disposed in such a manner as to face each other at both ends of electric discharge tube 1. Thereby, the light is amplified and stimulated emitted as laser. Thus, a part of the simulated emitted laser is extracted and output as laser 8 from partial reflection mirror 7 to the outside. Note here that helium gas has a cooling effect, and works to suppress a temperature increase of laser gas 2 and to return $CO_2$ molecules in a lower level which are not involved in laser oscillation to a normal energy level by collision.

Gas circulation path 9 as a circuit for circulating laser gas 2 is connected to electric discharge tube 1. In the middle of gas circulation path 9, blower unit 10 to blow laser gas 2 is disposed. With this blower unit 10, laser gas 2 in gas circulation path 9 is circulated so that the gas flows at about 100 m/sec in electric discharge tube 1.

Gas circulation path 9 is provided with a plurality of heat exchangers 11 to decrease a temperature of laser gas 2 which has become a high temperature due to electric discharge energy and heat of compression after having passed through the electric discharge part and blower unit 10.

To blower unit 10 and electric power 5, control unit 12 is connected to control them, respectively. Control unit 12 is also connected to warning unit 13.

As shown in FIG. 3, in the first exemplary embodiment, blower unit 10 uses a centrifugal blower unit and has impeller 14, which sucks laser gas 2 and ejects it by rotation, on rotating shaft 15. Motor rotor 16 is attached to rotating shaft 15, and motor stator 17 is disposed in a position facing motor rotor 16. Motor stator 17 is fixed to casing 18.

Furthermore, bearings 19a and 19b are disposed between rotating shaft 15 and casing 18, and rotatably support rotating shaft 15. The inside of bearings 19a and 19b is filled with grease 20 for lubrication. Grease supply mechanism 21 is disposed adjacent to each of bearings 19a and 19b, so that grease is supplied where grease is reduced over time due to volatilization and the like.

Grease supply control device 22 is connected to grease supply mechanism 21 so as to carry out detection of an amount of grease and supply of grease to grease supply mechanism 21.

Blower unit 10 is divided into a rotating part and a non-rotating part. The rotating part includes impeller 14, rotating shaft 15, motor rotor 16 and portions of bearings 19a and 19b that are brought into contact with rotating shaft 15.

Furthermore, the non-rotating part includes motor stator 17, casing 18 and portions of bearings 19a and 19b that are brought into contact with casing 18.

In the thus configured blower unit 10, when AC electric power is supplied to motor stator 17, motor rotor 16 is rotated with a generated rotating magnetic field, and impeller 14 is rotated via rotating shaft 15. Scroll 23 is disposed at the periphery of impeller 14, and laser gas 2 is blown by the rotation of impeller 14.

Then, as shown in FIG. 1, the gas laser oscillation device in accordance with the first exemplary embodiment supplies grease, and then drives blower unit 10 at a rotation rate lower than a rotation rate when a laser is output.

Specifically, the gas laser oscillation device of the first exemplary embodiment starts operation and works according to a flowchart shown in FIG. 1. That is to say, when an operation is started for carrying out a laser oscillation, control unit 12 drives and controls electric power 5 and blower unit 10 so that a desired output of laser 8 is obtained (Step S1). Simultaneously with this, a signal from grease supply control device 22 is input into control unit 12, and the amount of grease in bearings 19a and 19b is detected (Step S2).

It is determined whether or not the detected amount of grease is a regulated amount or less (Step S3). When the amount of grease is the regulated amount or more, control unit 12 continues to drive and control electric power 5 and blower unit 10 so that a desired output of laser 8 is obtained (from Step S4 to Step S1). On the other hand, when the amount of grease is not the regulated amount or more, control unit 12 stops the operations of electric power 5 and blower unit 10. When the operations are stopped, warning unit 13 is driven (Step S5).

Next, control unit 12 supplies a predetermined amount of grease to bearings 19a and 19b from grease supply mechanism 21 through grease supply control device 22 (Step S6).

Then, after grease is supplied, control unit 12 drives blower unit 10 at a rotation rate lower than a rotation rate when the laser is output. A so-called run test operation is carried out in a low-load state (Step S7).

For carrying out the run test operation during a predetermined set predetermined time necessary to allow grease to conform to the bearing, it is determined whether or not the predetermined time has passed (Step S8). When the predetermined time has not passed, the run test operation is continued. When the predetermined time has passed, control unit 12 stops warning unit 13 (Step S9), and drives and controls electric power 5 and blower unit 10 again so that a desired output of laser 8 is obtained (Step S1).

As mentioned above, the gas laser oscillation device of the first exemplary embodiment includes the electric discharge part including electrodes 3 and 4 and electric power 5 to generate electric discharge in laser gas 2; blower unit 10 to blow laser gas 2 to a portion in which electric discharge is generated by the electric discharge part; and control unit 12 to control drive of blower unit 10.

Blower unit 10 of the gas laser oscillation device includes a rotating part and a non-rotating part, bearings 19a and 19b disposed between the rotating part and the non-rotating part, and grease supply mechanism 21 to supply grease to each of bearings 19a and 19b. Herein, the rotating part includes impeller 14, rotating shaft 15, motor rotor 16, and portions of bearings 19a and 19b that are brought into contact with rotating shaft 15, which rotate. The non-rotating part includes motor stator 17, casing 18 and portions of bearings 19a and 19b that are brought into contact with casing 18, which do not rotate.

Control unit 12 of the gas laser oscillation device is configured to drive blower unit 10 at a rotation rate lower than the rotation rate when the laser is output after grease is supplied from grease supply mechanism 21 to bearings 19a and 19b.

With this configuration, grease is spread to the inside of bearings 19a and 19b, so that wear and heat generation between the rotating shaft and the bearings can be reduced. Consequently, the lifetime of bearings 19a and 19b can be extended. Thus, high reliability can be ensured for a long time.

Furthermore, control unit 12 is configured to drive blower unit 10 at the rotation rate lower than the rotation rate when the laser is output for a predetermined set time, and then drive blower unit 10 at the rotation rate when the laser is output by increasing the rotation rate.

With this configuration, since the rotation rate is increased to the rotation rate when the laser is output after grease is spread to the inside of bearings 19a and 19b, wear and heat generation between the rotating shaft and the bearings can be reduced. Thus, the lifetime of bearings 19a and 19b can be extended, and high reliability can be ensured for a long time.

Second Exemplary Embodiment

Figure 4:
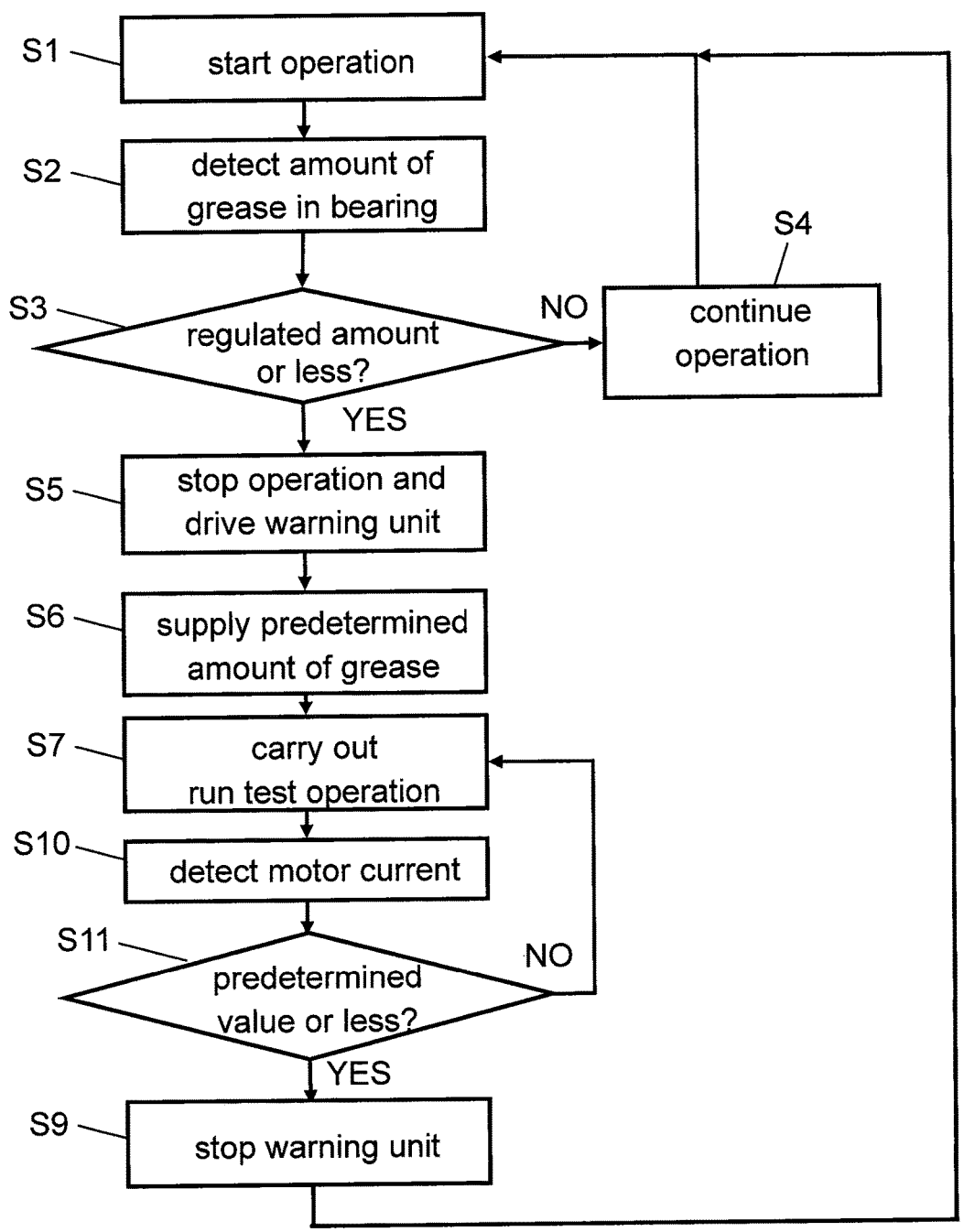
FIG. 4 is a flowchart of a gas laser oscillation device in accordance with a second exemplary embodiment of the present invention.

FIG. 4 is a flowchart of a gas laser oscillation device in accordance with a second exemplary embodiment of the present invention. In the second exemplary embodiment, the same reference numerals are given to the same components as those in the first exemplary embodiment and the description thereof is omitted.

The second exemplary embodiment is characterized in that, specifically, during the run test operation in the first exemplary embodiment, control unit 12 carries out control by detecting a current flowing in motor stator 17 instead of detecting a predetermined time necessary for allowing grease to conform.

Since the current flowing in a motor is increased according to a load, during a time in which lubrication of bearings is insufficient immediately after grease is supplied, friction occurs in sliding of bearings 19a and 19b and a motor current becomes large. On the other hand, when the grease is spread to bearings 19a and 19b sufficiently, the friction is reduced and the motor current is reduced. By detecting reduction of the motor current, control is carried out to determine whether or not a run test operation is completed.

Specifically, the gas laser oscillation device starts an operation to carry out oscillation as shown in a flowchart of FIG. 4. Then, control unit 12 drives and controls electric power 5 and blower unit 10 so that a desired output of laser 8 is obtained (Step S1). Simultaneously with this, a signal from grease supply control device 22 is input into control unit 12, and the amount of grease in bearings 19a and 19b is detected (Step S2).

It is determined whether or not the detected amount of grease is a regulated amount or less (Step S3). When the amount of grease is the regulated amount or more, control unit 12 continues to drive and control electric power 5 and blower unit 10 so that a desired output of laser 8 is obtained (from Step S4 to Step S1). On the other hand, when the amount of grease is not the regulated amount or more, control unit 12 stops the operations of electric power 5 and blower unit 10. When the operations are stopped, warning unit 13 is driven (Step S5).

Next, control unit 12 supplies a predetermined amount of grease to bearings 19a and 19b from grease supply mechanism 21 through grease supply control device 22 (Step S6).

Then, after grease is supplied, control unit 12 drives blower unit 10 at a rotation rate lower than a rotation rate when the laser is output. A so-called run test operation is carried out in a low-load state (Step S7).

Next, for detecting the motor current, control unit 12 detects a current flowing in motor stator 17 (Step S10).

It is determined whether or not the detected motor current is a predetermined value or less (Step S11). When the detected motor current is the predetermined value or more, the run test operation is continued. When the detected motor current is the predetermined value or less, control unit 12 stops warning unit 13 (Step S9), and drives and controls again electric power 5 and blower unit 10 so that a desired output of laser 8 is obtained (Step S1).

As mentioned above, in the gas laser oscillation device in accordance with the second exemplary embodiment, a member including a motor is used as blower unit 10, and control unit 12 detects a load of the motor by detecting a current flowing in the motor. The gas laser oscillation device is configured to drive blower unit 10 at a rotation rate lower than the rotation rate when the laser is output until the load of the motor is reduced and then drive blower unit 10 at the rotation rate when the laser is output by increasing the rotation rate.

With this configuration, it is possible to confirm a state in which grease 20 is spread to the inside of bearings 19a and 19b by a current flowing in the motor. The lifetime of bearings 19a and 19b can be extended. Thus, high reliability can be ensured for a long time, and a desired laser output can be obtained without delay for a short time.

Third Exemplary Embodiment

Figure 5:
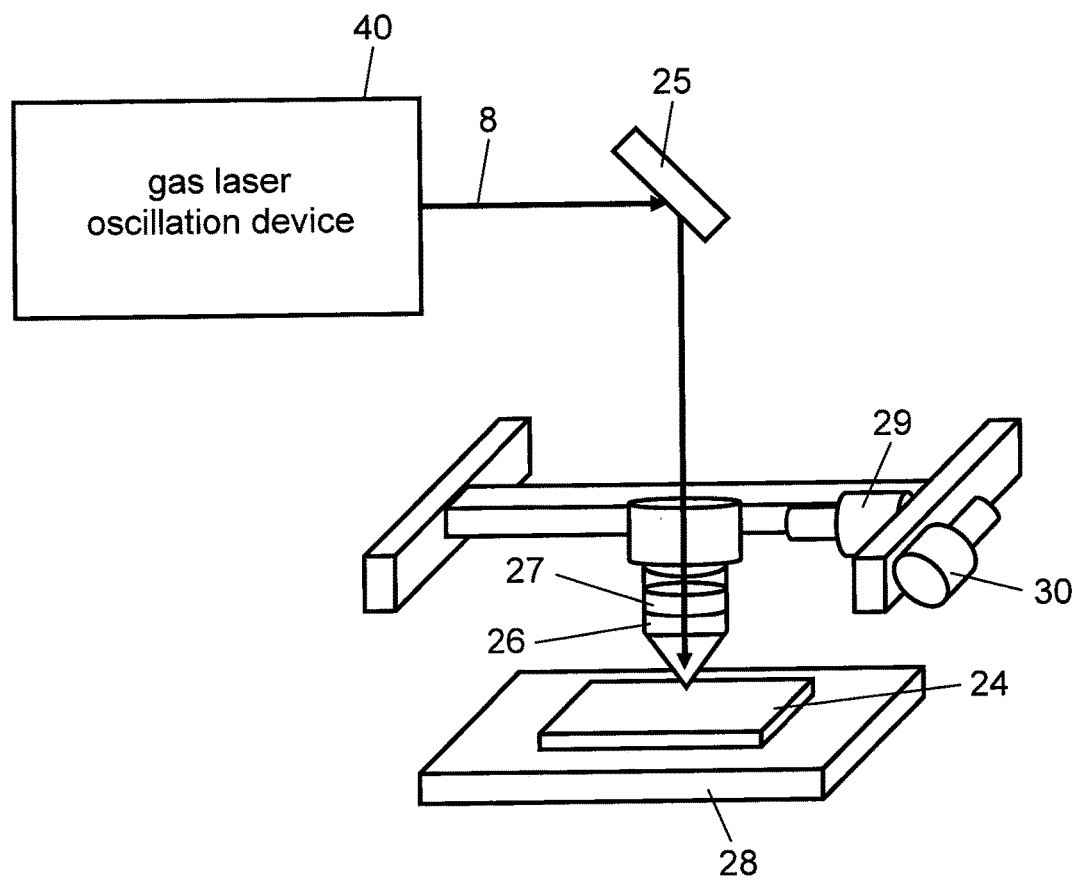
FIG. 5 is a configuration view of a gas laser processing machine in accordance with a third exemplary embodiment of the present invention.

FIG. 5 is a configuration view of a gas laser processing machine in accordance with a third exemplary embodiment of the present invention. The gas laser oscillation device in accordance with the first and second exemplary embodiments of the present invention mentioned above can be used for the gas laser processing machine shown in FIG. 5. The schematic configuration thereof is described with reference to FIG. 5.

As shown in FIG. 5, laser 8 output from gas laser oscillation device 40 in accordance with the first and second exemplary embodiments is reflected by reflection mirror 25 and thereby changes its traveling direction so that workpiece 24 is irradiated with laser 8. Then, laser 8 is gathered into a high-density energy beam of light by condenser lens 27 provided in torch 26, and workpiece 24 is irradiated with laser 8.

Workpiece 24 is fixed on machining table 28. By moving torch 26 relative to workpiece 24 by a drive unit configured to include X-axis motor 29 or Y-axis motor 30, processing into a predetermined shape is carried out.

That is to say, the gas laser processing machine of the present invention is configured to include the above-described gas laser oscillation device 40, and a drive unit to move laser 8 irradiated from gas laser oscillation device 40 relative to workpiece 24 to which the irradiated light is applied.

With this configuration, after grease is supplied from the grease supply mechanism to the bearing, the blower unit is driven at a rotation rate lower than the rotation rate when a laser is output. Therefore, grease is spread to the inside of the bearing, and wear and heat generation between the rotating shaft and the bearing can be reduced. Consequently, the lifetime of the bearing can be extended. Thus, a gas laser processing device of the present invention can ensure high reliability for a long time.

INDUSTRIAL APPLICABILITY

In a gas laser oscillation device and a gas laser processing machine of the present invention, grease can be spread to the inside of a bearing, the lifetime of the bearing can be extended, and high reliability can be ensured for a long time. Therefore, the gas laser oscillation device and the gas laser processing machine are useful for processing various workpieces.

REFERENCE MARKS IN DRAWINGS 1 electric discharge tube
2 laser gas
3, 4 electrode
5 electric power
6 total reflection mirror
7 partial reflection mirror
8 laser
9 gas circulation path
10 blower unit
11 heat exchanger
12 control unit
13 warning unit
14 impeller
15 rotating shaft
16 motor rotor
17 motor stator
18 casing
19a, 19b bearing
20 grease
21 grease supply mechanism
22 grease supply control device
23 scroll
24 workpiece
25 reflection mirror
26 torch
27 condenser lens
28 machining table
29 X-axis motor
30 Y-axis motor
40 gas laser oscillation device

The invention claimed is:

1. A gas laser oscillation device comprising:
an electric discharge part to generate electric discharge in a gas;
a power source for applying power to the electric discharge part so that the electric discharge part produces laser output;
a blower unit to blow the gas to a portion in which electric discharge is generated by the electric discharge part, wherein a member including a motor is used as the blower unit;
bearings disposed between a rotating part that rotates and a non-rotating part that does not rotate in the blower unit;
a grease supply mechanism to supply grease to each of the bearings;
a grease supply control device to directly measure an amount of grease in the bearings and supply grease to the grease supply mechanism; and
a control unit including a first coupling with the blower unit and a second coupling with the power source, the control unit configured to:
during a first time period, reduce operation of the blower unit via the first coupling, the first time period occurring when the grease supply control device signals that the amount of grease is below a predetermined amount,
during a second time period following the first time period, maintain the blower unit at a first rotation rate greater than zero via the first coupling, the second time period occurring after grease is supplied to the bearings,
during a third time period following the second time period, drive the blower unit at a second rotation rate higher than the first rotation rate,
during the first and second time periods, prevent the power source from causing the electric discharge part from producing laser output via the second coupling, and
during the third time period, allow the power source to cause the electric discharge part to produce laser output via the second coupling,
wherein the control unit is further configured to detect a load of the motor by detecting a current flowing in the motor, and wherein the control unit is configured to change from the second time period to the third time period when the load of the motor falls below a predetermined value.

2. The gas laser oscillation device of claim 1, wherein the control unit drives the blower unit at the first rotation rate for a predetermined set time, and then drives the blower unit at the second rotation rate.

3. The gas laser oscillation device of claim 1, wherein the grease supply mechanism is provided adjacent to each of the bearings.

4. The gas laser oscillation device of claim 1, wherein when the amount of grease detected by the grease supply control device is a regulated amount or less, the control unit stops electric power of the electric discharge part and the blower unit, and supplies grease from the grease supply mechanism to the bearings via the grease supply control device.

5. The gas laser oscillation device of claim 1, wherein the control unit drives the blower unit at the first rotation rate directly after grease is supplied from the grease supply mechanism to the bearings.

6. A gas laser processing machine comprising:
a gas laser oscillation device, and
a drive unit to move laser irradiated from the gas laser oscillation device relative to a workpiece to which the irradiated laser is applied, wherein
the gas laser oscillation device includes:
an electric discharge part to generate electric discharge in a gas;
a power source for applying power to the electric discharge part so that the electric discharge part produces laser output;
a blower unit to blow the gas to a portion in which electric discharge is generated by the electric discharge part, wherein a member including a motor is used as the blower unit;

bearings disposed between a rotating part that rotates and a non-rotating part that does not rotate in the blower unit;

a grease supply mechanism to supply grease to each of the bearings;

a grease supply control device to directly measure an amount of grease in the bearings and supply grease to the grease supply mechanism; and a control unit including a first coupling with the blower unit and a second coupling with the power source, the control unit configured to:
- during a first time period, reduce operation of the blower unit via the first coupling, the first time period occurring when the grease supply control device signals that the amount of grease is below a predetermined amount,
- during a second time period following the first time period, maintain the blower unit at a first rotation rate greater than zero via the first coupling, the second time period occurring after grease is supplied to the bearings,
- during a third time period following the second time period, drive the blower unit at a second rotation rate higher than the first rotation rate
- during the first and second time periods, prevent the power source from causing the electric discharge part from producing laser output via the second coupling, and
- during the third time period, allow the power source to cause the electric discharge part to produce laser output via the second coupling, wherein the control unit is further configured to detect a load of the motor by detecting a current flowing in the motor, and wherein the control unit is configured to change from the second time period to the third time period when the load of the motor falls below a predetermined value.

7. The gas laser processing machine of claim 6, wherein the control unit drives the blower unit at the first rotation rate for a predetermined set time, and then drives the blower unit at the second rotation rate.

8. The gas laser processing machine of claim 6, wherein the grease supply mechanism is provided adjacent to each of the bearings.

9. The gas laser processing machine of claim 6, wherein when the amount of grease detected by the grease supply control device is a regulated amount or less, the control unit stops electric power of the electric discharge part and the blower unit, and supplies grease from the grease supply mechanism to the bearings via the grease supply control device.

* * * * *